United States Patent
Pai et al.

(10) Patent No.: US 8,497,439 B2
(45) Date of Patent: Jul. 30, 2013

(54) SELF-ALIGNING SECONDARY DISCONNECT DEVICE FOR ELECTRICAL SWITCHGEAR

(75) Inventors: Arvind Pai, Hyderabad (IN); Sapuram Sudhakar, Hyderabad (IN); Kapil Vinodrao Bavikar, Hyderabad (IN); Glen Charles Sisson, Plainville, CT (US)

(73) Assignee: General Electric Company, Schenectady, NY (US)

( * ) Notice: Subject to any disclaimer, the term of this patent is extended or adjusted under 35 U.S.C. 154(b) by 293 days.

(21) Appl. No.: 13/044,700

(22) Filed: Mar. 10, 2011

(65) Prior Publication Data
US 2012/0228098 A1    Sep. 13, 2012

(51) Int. Cl.
*H02B 11/04* (2006.01)
(52) U.S. Cl.
USPC .............. 200/50.21; 200/50.27; 361/636
(58) Field of Classification Search
USPC ............ 200/50.21–50.27; 361/600–615, 361/622, 624, 627, 628, 631, 634, 637–641, 361/643, 647–650, 652, 656, 636
See application file for complete search history.

(56) References Cited

U.S. PATENT DOCUMENTS

| | | | |
|---|---|---|---|
| 3,958,156 A | | 5/1976 | Tjebben |
| 4,020,301 A | | 4/1977 | Ericson et al. |
| 4,477,701 A | | 10/1984 | Castonguay et al. |
| 5,036,437 A | | 7/1991 | Macks |
| 5,434,369 A | | 7/1995 | Tempco et al. |
| 5,691,518 A | | 11/1997 | Jones et al. |
| 6,179,637 B1 | | 1/2001 | Lee et al. |
| 7,663,867 B2 | * | 2/2010 | Rane et al. .............. 361/636 |
| 7,927,155 B2 | * | 4/2011 | Mittu et al. .............. 439/700 |
| 2009/0014292 A1 | * | 1/2009 | Lyu ...................... 200/50.26 |
| 2009/0257174 A1 | * | 10/2009 | Rane et al. .............. 361/673 |
| 2012/0255839 A1 | * | 10/2012 | Grasnick ................. 200/50.27 |

OTHER PUBLICATIONS

ABB, Inc. "Advance Abbreviated Switchgear Medium Voltage, Metal Clad Offerings for OEM Applications." www.abb.com/mediumvoltage.
Controlled Power, LLC. "5kV and 15kV Class Metal-Clad Switchgear" http://www.controlledpower.com/5kv&15kVMetalClad.pdf.
M & I Electric Far East PTE Ltd. "Low Voltage Metal Enclosed Switchgear Type LC." http://www.aeti.com/images/Lc.pdf.
ABB, Inc."Specification Guide for RVAC Direct Displacement AC Medium Voltage Circuit Breakers." http://library.abb.com/global/scot/scot235.nsf/veritydisplay/90b7e9f76628334985256f170049fae5/$File/Specification_Guide_MV_RVAC_Replacement_Breaker.pdf.

* cited by examiner

*Primary Examiner* — Michael Friedhofer
(74) *Attorney, Agent, or Firm* — Global Patent Operation; Stephen G. Midgley

(57) ABSTRACT

A secondary disconnect apparatus for a circuit breaker, for making a slidable electrical connection with a mating enclosure-side secondary disconnect apparatus, is disclosed, having a pair of stop plate surfaces coupled to the circuit breaker defining a first linear distance D1, and a lateral adjustment portion in slidable communication with a pair of a guide members configured to guide movement of the lateral adjustment portion along an axis in one of a first and a second direction. The apparatus includes and a pair of adjustment member surfaces coupled to the lateral adjustment portion defining a second linear distance D2, wherein the adjustment member surfaces are configured to cooperate with the stop plate surfaces to limit the travel of lateral adjustment portion, and wherein a total predetermined lateral distance of travel of lateral adjustment portion 250 is defined based on at least the difference between first distance D1 and second distance D2.

7 Claims, 6 Drawing Sheets

SELF-ALIGNING SECONDARY DISCONNECT DEVICE FOR ELECTRICAL SWITCHGEAR

BACKGROUND OF THE INVENTION

1. Field of the Invention

The field of the invention relates to electrical switchgear apparatus generally, and more particularly to certain new and useful advances in secondary disconnect devices, of which the following is a specification, reference being had to the drawings accompanying and forming a part of the same.

2. Description of Related Art

Conventional electrical distribution systems employ switching devices, such as for example, circuit breakers in switchgear applications, are conventionally housed in a metal enclosure or "drawout" unit. The drawout units releasably connect the electrical switching devices to an electrical busbar. It is sometimes necessary, such as for scheduled maintenance or testing purposes, to move, or "rack", the circuit breaker in and out of the enclosure to make and break electrical connection within an electrical power distribution circuit. Conventional drawout units are configured to rack the circuit breakers between a disconnect position, in which the primary contacts or terminals of the circuit breaker are fully disengaged from mating primary contacts within the enclosure, and a connect position in which the primary contacts of the circuit breaker and enclosure are fully engaged. A racking mechanism is typically employed to ensure steady movement of the circuit breaker as it moves between the disconnect and connect positions.

Circuit breakers are also typically equipped with a variety of auxiliary electronic devices and related control circuitry, including switches, motors, solenoids and the like, for providing control of various functions of the circuit breaker such cases, terminals are conventionally arranged on the outside surface of the circuit breaker assembly to provide power to the auxiliary devices and control circuitry, and arranged for automatic connection and disconnection from corresponding mating terminals or contacts arranged within the enclosure. Such corresponding terminals arranged on the circuit breaker and the enclosure are conventionally referred to as "secondary disconnect" terminals or contacts, to distinguish these terminals from the main or "primary" current-carrying circuit breaker and enclosure terminals.

When the circuit breaker is inserted, or racked in, from the disconnect position to the connect position, the corresponding secondary disconnect terminals on the circuit breaker and enclosure must be engaged for power to provided to the auxiliary devices and control electronics. Conversely, when the circuit breaker is removed, or racked out, to the disconnect position, the secondary disconnect terminals must be disengaged. Additionally, it is common to provide a test position, between the connect and disconnect positions of the circuit breaker, wherein the secondary disconnect terminals are engaged, but the primary terminals are not engaged. In such cases, the auxiliary functions of the circuit breaker can be safely tested while the circuit breaker is disconnected from the primary circuit, or "OFF".

It is generally desirable for the secondary terminals to engage as the circuit breaker is racked in to the test position, and to remain engaged as the circuit breaker continues to be racked in past the test position to the full connect position. Likewise, upon removal of the circuit breaker, it is generally desirable for the corresponding secondary terminals to remain engaged as the circuit breaker is racked out from the connect position back to the test position, but to disengage if the circuit breaker is racked out past the test position to the fill disconnect position. Apparatus for connecting and disconnecting the corresponding secondary terminals of the circuit breaker and enclosure are generally referred to in the art as "secondary disconnect" apparatus. Generally, secondary disconnect apparatus operates such that engagement and disengagement of the secondary terminals is incident to the racking movement of the circuit breaker into and out of its enclosure.

Many conventional secondary disconnect apparatus comprise any number of pairs of corresponding or mating secondary terminals arranged for slidable connection. In many cases, half of each pair of mating secondary terminals includes a conductive surface or receptacle fixedly coupled to the enclosure, while the corresponding half of each pair includes a conductive member fixedly coupled to the circuit breaker. In operation, as the circuit breaker is racked in to the test position, each corresponding pair of secondary terminals makes contact and begin to slide upon each other in electrical connection. As the circuit breaker is subsequently racked past the test position and into the full connect position, each corresponding pair of secondary terminals continue to slide against each other, thereby maintaining contact throughout the entire travel of the circuit breaker. Conversely, when the circuit breaker is racked out of the enclosure, each corresponding pair of terminals disconnect or slide of each other and disconnect.

A known shortcoming of conventional sliding-type secondary disconnect apparatus is that lateral misalignment at or near the test position, between the secondary terminals coupled to the enclosure and the secondary terminals coupled to the circuit breaker prevents proper connection of the secondary conductors.

For example, a known shortcoming of conventional sliding type secondary disconnect apparatus is lateral misalignment of the mating secondary terminals that occurs in the event of a new circuit breaker being retrofit into an existing or legacy enclosure or cubicle. Such lateral misalignment of corresponding secondary disconnect terminals might occur due to inherent tolerance stack-ups in the legacy enclosure and the new breaker being inserted.

For at least the reasons stated above, a need exists for circuit breaker having a secondary disconnect terminal apparatus that enables a lateral movement of the circuit breaker secondary disconnect terminals to allow proper engagement with the corresponding enclosure secondary disconnect terminals.

Also, for at least the reasons stated above, a need exists for a circuit breaker having a secondary disconnect apparatus that is simple, inexpensive, uses few moving parts, and overcomes the aforementioned limitations and deficiencies of known secondary disconnect apparatus.

BRIEF SUMMARY OF THE INVENTION

A secondary disconnect apparatus for a circuit breaker is disclosed, for making an electrical connection with a mating enclosure secondary disconnect apparatus. The apparatus comprising a first stop plate comprising a first stop plate surface, a second stop plate comprising a second stop plate surface, said first and second stop plates being configured to be coupled to the circuit breaker such that said first and second stop plate surfaces are spaced apart to define a first distance D1, a secondary terminal member, arranged and disposed to facilitate a slidable connection with the mating enclosure secondary disconnect assembly, a base portion configured to support said secondary terminal member, a lateral adjustment portion coupled to said base portion, comprising a first adjustment member surface and a second adjustment member surface the adjustment member surfaces being spaced apart to define a second distance D2, a first guide member and a second guide member being in slidable communication with, and configured to guide a movement of said lateral adjustment portion along an axis in one of a first and a second direction, wherein said first adjustment member surface is configured to cooperate with said first stop plate surface to limit the travel of lateral adjustment portion in the first direction, and said second adjustment member surface is configured to cooperate with said second stop plate surface to limit the travel of lateral adjustment portion in the second direction, and wherein a total predetermined lateral distance of travel of lateral adjustment portion is based on at least the difference between first distance D1 and second distance D2.

One or more specific embodiments shown and/or described herein address at least the above-mentioned need. Methods and systems of varying scope are shown and described herein. In addition to the advantages described above, further advantages and/or adaptations or variations will become apparent by reference to the drawings and by reading the remaining portions of the specification.

BRIEF DESCRIPTION OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION OF THE INVENTION

The following description makes reference to the accompanying drawings that form a part hereof, and in which is shown by way of illustration specific embodiments that may be practiced. It is understood that other embodiments may be utilized and that various changes can be made to the embodiments shown and described herein without departing from the patentable scope of the claims appended hereto. The following description is, therefore, not to be taken in a limiting sense.

Figure 1:
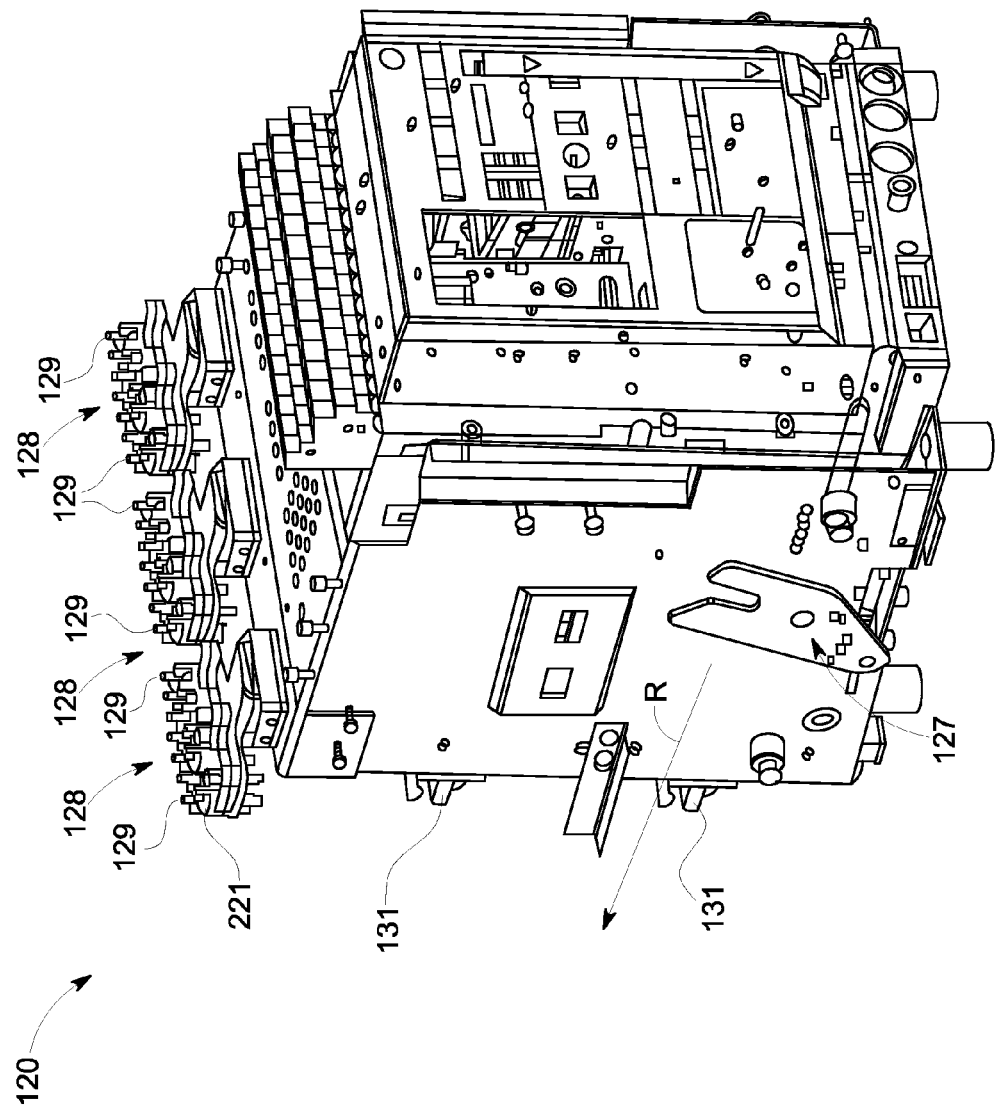
FIG. 1 is a perspective view of an embodiment of a circuit breaker.
Figure 2:
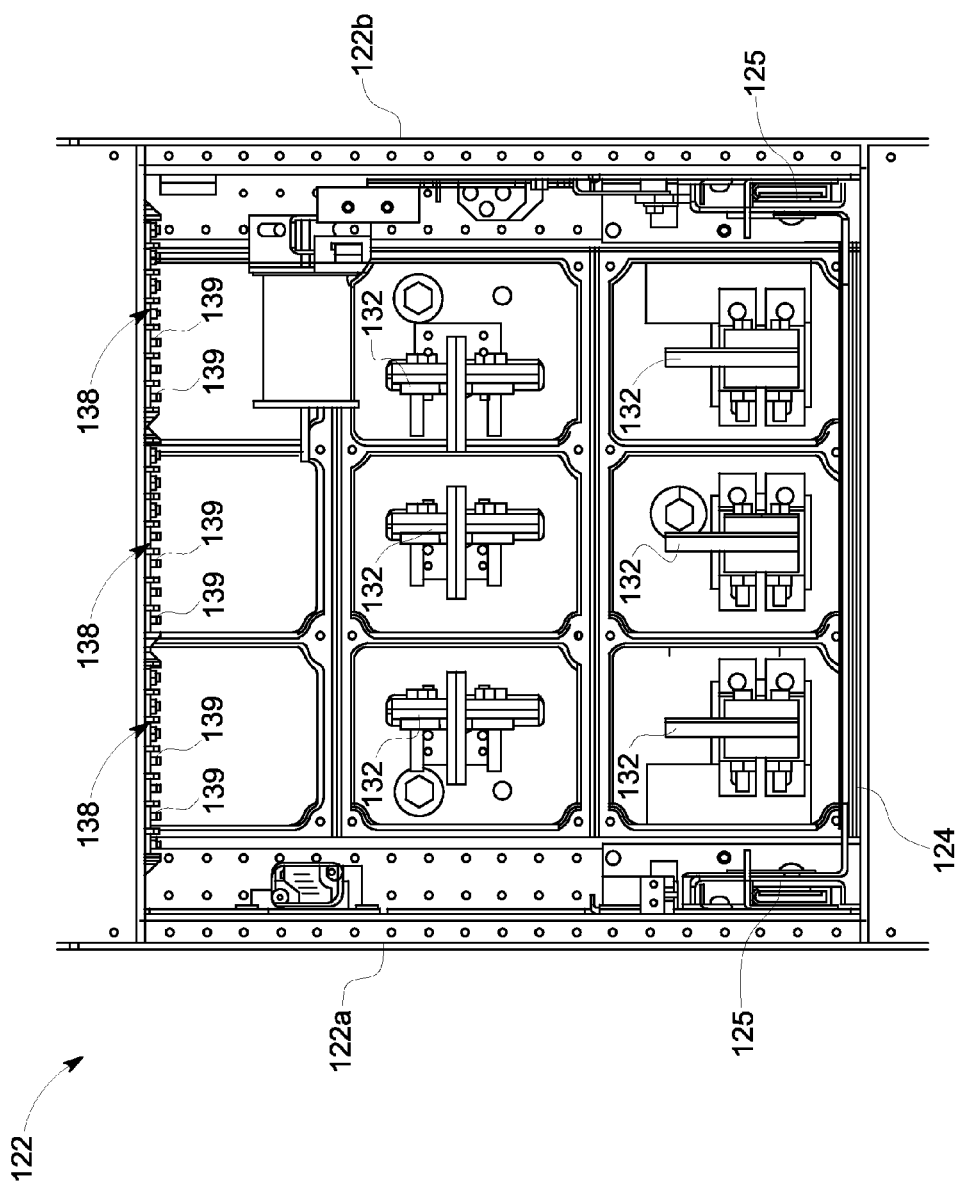
FIG. 2 is a front view of an interior of an embodiment of a circuit breaker enclosure.

Referring to FIG. 1 and FIG. 2, an embodiment of the invention is a circuit breaker 120 configured for racking into and out of a compartment or enclosure 122, having space apart sidewalls 122a, 122b, of an electrical equipment stack or switchboard (not shown). The circuit breaker 120 is mounted on a carriage, generally indicated at 124, which in turn is supported for racking by opposed telescoping side rail assemblies 125 mounted to the compartment sidewalk 122a, 122b.

Circuit breaker 120 comprises a plurality of circuit breaker primary disconnect terminals 131 (FIG. 1), each configured and located to engage with a corresponding enclosure primary disconnect terminal 132 (FIG. 2) arranged within enclosure 122 of the switchboard (not shown). While FIG. 2 illustrates six enclosure primary disconnect terminals 132, it will be appreciated that any desired number of corresponding circuit breaker and switchboard primary disconnect terminals may be used in other embodiments.

Additionally, circuit breaker 120 comprises at least one circuit breaker secondary disconnect terminal apparatus 128, comprising a plurality of circuit breaker secondary terminal members 129 configured and located to slidably engage with corresponding terminal receptacles 139 of a switchboard secondary disconnect apparatus 138 disposed within compartment 122 of switchboard (not shown).

It will be understood that while FIG. 1 illustrates three circuit breaker disconnect apparatus 128, each having seven secondary terminal members 129, any desired number of corresponding circuit breaker secondary disconnect apparatus 128 having any desired number of secondary terminal members 129 may be used in an embodiment.

Figure 3:
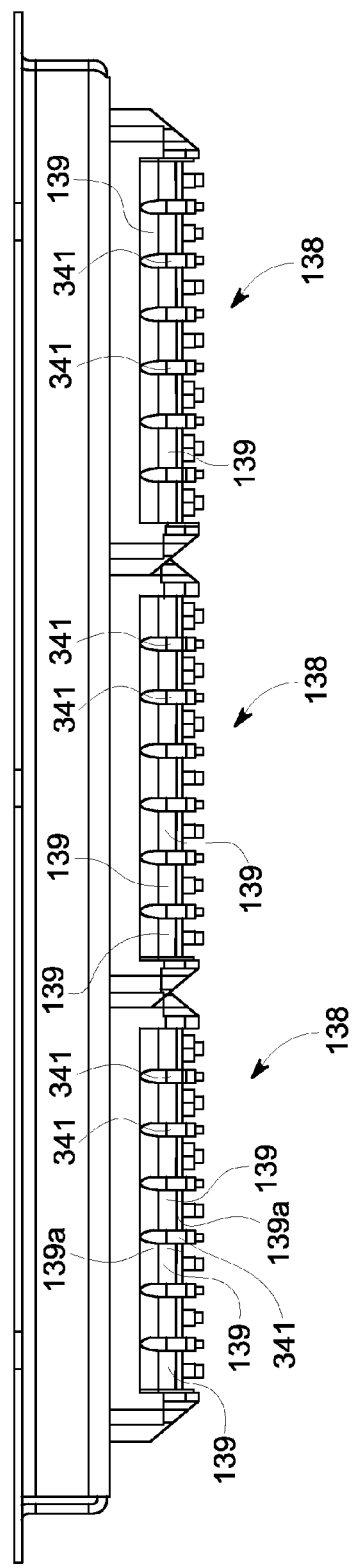
FIG. 3 is a front view of an embodiment of the secondary disconnect assembly of the circuit breaker enclosure of FIG. 2.
Figure 4:
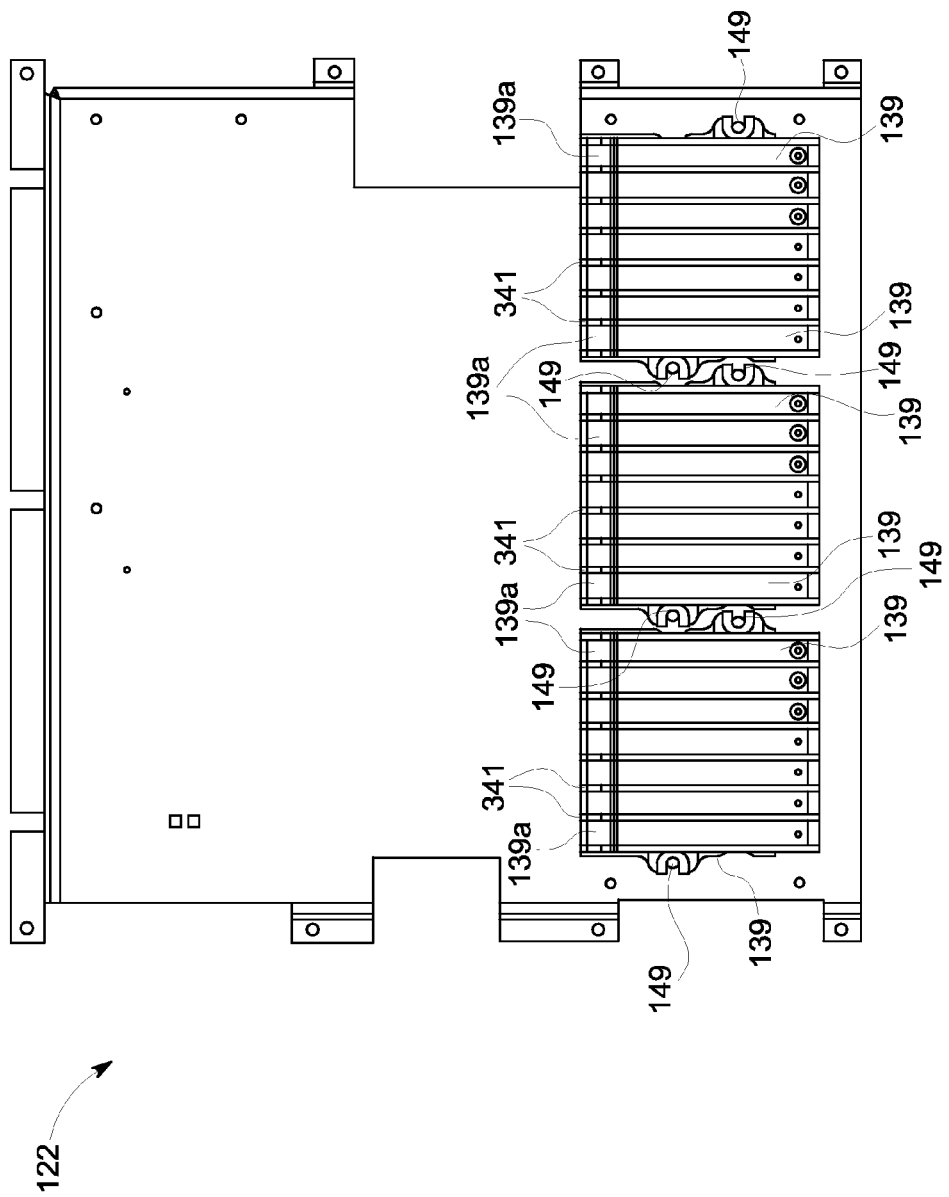
FIG. 4 is a bottom view of an interior of an embodiment of the circuit breaker enclosure of FIG. 2.

As illustratively shown in FIGS. 3 and 4, three enclosure secondary disconnect apparatus 138 each comprise a plurality of secondary terminal receptacles 139. Each enclosure secondary disconnect apparatus 138 is fixedly or rigidly mounted to enclosure 122 (FIG. 2) with at least two fasteners 149. In one embodiment, the fasteners 149 are threaded. A rib 341 (FIG. 4) preferably formed of a suitable material such as an electrically insulative polymer, separates each secondary terminal receptacle 139 from any adjacent secondary terminal receptacle 139. In an exemplary embodiment, each secondary terminal receptacle 139 comprises a generally flat surface arranged and disposed to facilitate a slidable connection with a corresponding circuit breaker secondary terminal member 129 during a racking operation. A first end of each enclosure secondary terminal receptacle 139 may additionally comprise a ramped portion 139a configured to guidably receive the corresponding circuit breaker secondary terminal member 129 at the initiation of contact between the secondary terminal member 129 and secondary terminal receptacle 139. The enclosure secondary terminal members 139 may also comprise a second terminal end (not shown) configured and disposed to facilitate an electrical connection with switchboard secondary circuit wiring (not shown).

Figure 5:
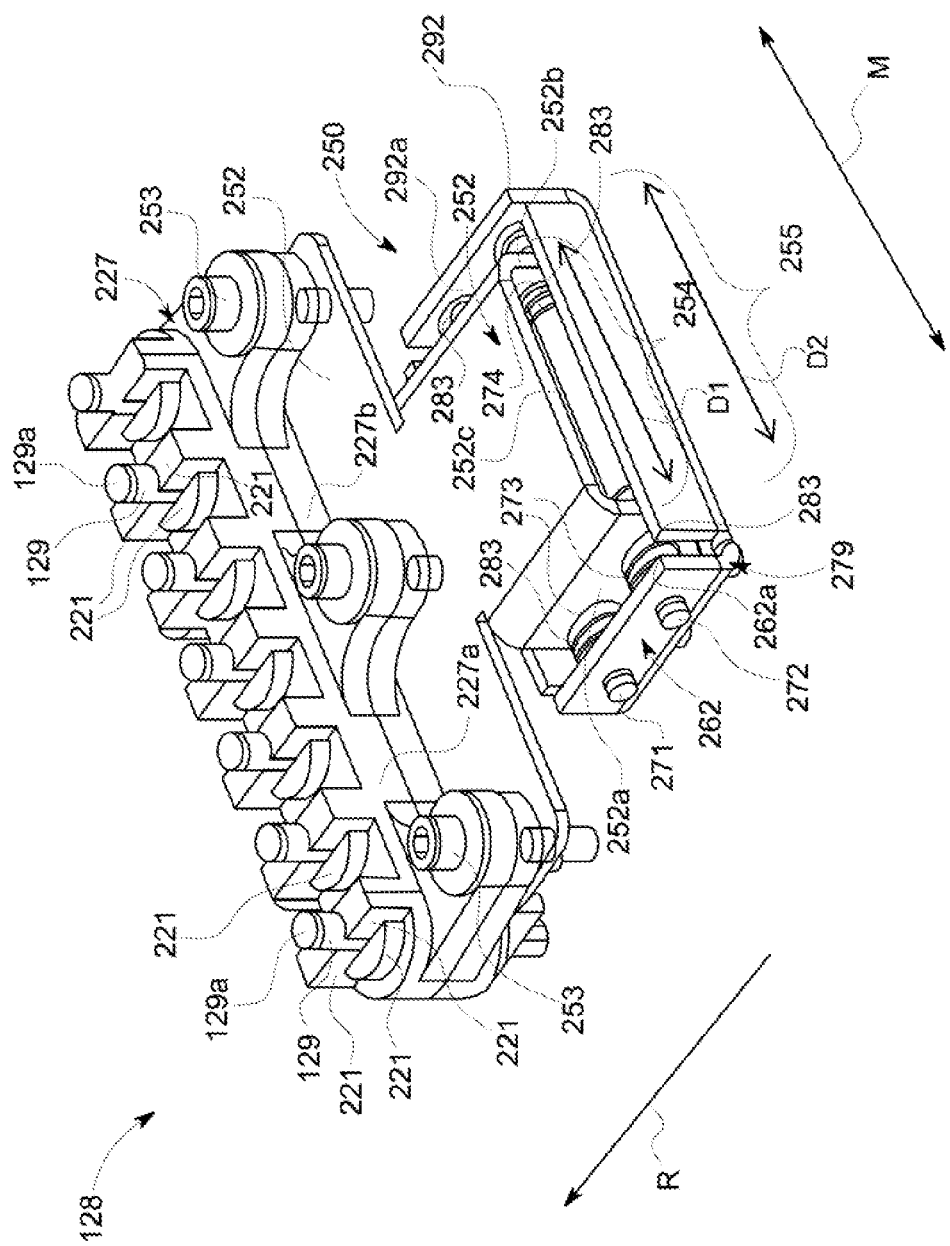
FIG. 5 is a perspective view of an embodiment of a circuit breaker secondary disconnect assembly.

As shown in FIG. 5, a circuit breaker secondary disconnect assembly 128 comprising a plurality of circuit breaker secondary terminal members 129 is configured to be fixedly mounted to circuit breaker 120 (FIG. 1). In an embodiment, at least two threaded fasteners (not shown) are used to secure each circuit breaker secondary disconnect assembly 128 to circuit breaker 120. It will be understood that an embodiment may comprise any number of circuit breaker secondary disconnect assemblies 128, having any desired number of circuit secondary terminal members 129.

Each of the circuit breaker secondary terminal members 129 comprises a first contact end 129a. As shown, buy way of example and not limitation, the first contact end 129a is a smooth hemispherical surface arranged and disposed to facilitate a slidable connection with a corresponding enclosure secondary terminal receptacle 139. Each of the circuit breaker secondary terminal members 129 may also comprise a second terminal end (not shown) configured and disposed for electrical connection with circuit breaker secondary circuit wiring (not shown).

The circuit breaker secondary disconnect apparatus 128 comprises abuse portion 227 to provide support for secondary terminal members 129. In an embodiment, base portion 227 may be formed of two mating portions 227a, 227b to facilitate assembly. Preferably, base portion 227 is formed of a suitable material, and arranged such that each secondary terminal member 129 of circuit breaker secondary disconnect assembly 128 is electrically insulated from any adjacent secondary terminal receptacle 129. In one embodiment, base portion 227 is formed from an electrically insulative polymeric material and comprises a plurality of terminal member supports 221. Terminal member supports 221 are arranged proximal to each secondary disconnect member 129 and preferably configured and arranged to substantially limit lateral movement of the corresponding secondary terminal member 129. In one embodiment, the terminal member supports 221 are formed from an electrically insulative polymeric material and integral to the base portion 227.

Additionally, each circuit breaker secondary disconnect 128 comprises a lateral adjustment portion 250. Lateral adjustment portion 250 may be formed integral to base portion 227 or may be attached to base portion 227, for example by fasteners 253 such as threaded fasteners. Lateral adjustment portion 250 includes an adjustment member 252, having a first adjustment member surface 252a and a second adjustment member surface 252b. The first and second adjustment member surfaces 252a, 252b are spaced apart to define a gap 254 having a lateral distance In an embodiment, lateral adjustment portion 250 is slidably engaged with a first and a second guide member 271, 272. In the embodiment shown in FIG. 5, first and second guide members 271, 272 are arranged substantially parallel and disposed through respective apertures 273 in first adjustment member surface 252a, and through respective apertures 274 in second adjustment member surface 252b, and configured to allow and guide a lateral movement, while preventing a rotational movement of lateral adjustment portion 250.

In order to prevent "over travel" or limit the lateral movement of lateral adjustment portion 250 to a total predetermined distance D3, a first stop plate 262 having a first stop plate surface 262a, and a second stop plate 262 having second stop plate surface 292a are arranged to define a gap 255 having a distance D2. The first adjustment member surface 252a is configured and located to cooperate with the first stop plate surface 262a to limit a first travel of lateral adjustment portion 250. Similarly, the second adjustment member surface 252b is configured and located to cooperate with the second stop plate surface 292a to limit a second travel of lateral adjustment portion 250. In an exemplary embodiment, first and second stop plate surfaces 262a, 292a, are arranged and located to cooperate with first and second adjustment member surface 252a, 252b such that first gap distance D1 is unequal to second gap distance D2, and the total predetermined lateral distance of travel D3 of lateral adjustment portion 250 is defined based on at least the difference between first gap distance D1 and second gap distance D2.

In an exemplary embodiment, first and second guide members 271, 272 are coupled to first and second stop plates 262, 292. In another embodiment, at least two resilient biasing members 283, such as coil springs are disposed between first and second adjustment member surface 252a, 252b, and first and second stop plate surfaces 262a, 292a to provide a biasing or return force. In the embodiment illustrated in FIG. 5, four resilient members 283 are configured as coil springs, with two of the resilient members 283 supported by first guide member 271 and two of the resilient members 283 supported by second guide member 272. Additionally, in the embodiment FIG. 5, two of the resilient members 283 are disposed between adjustment plate 252 and first stop plate 262, and two of the resilient members 283 are disposed between adjustment plate 252 and second stop plate 292.

In an exemplary embodiment, adjustment plate 252 comprises a U-shaped cross-section wherein the adjustment member surface 252a 252b are formed by the legs of the U-shaped cross section, and connected by the bight portion 252c. Additionally, the first leg 252a is disposed to cooperate with the first stop plate 262, and second leg 252b is disposed to cooperate with the second stop plate 292.

In one embodiment, an anchor member 279 is coupled to and supports the first and second stop plates 262, 292, and is arranged for mechanical connection to the circuit breaker 120. In yet another embodiment (not shown), the first and second stop plates 262, 292, are coupled directly to circuit breaker 120.

Figure 6:
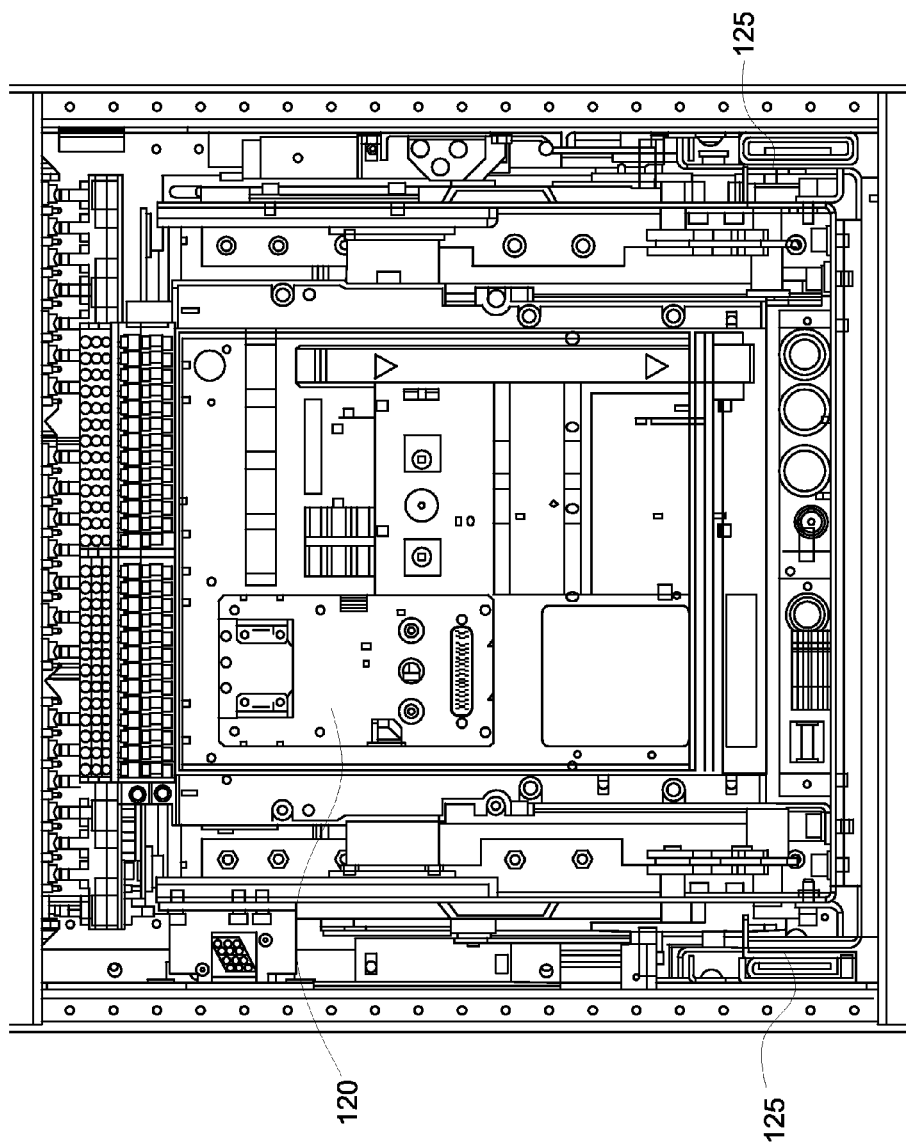
FIG. 6 is a front view of the interior of the circuit breaker enclosure of FIG. 2 with the circuit breaker of FIG. 1 installed.

Referring to FIG. 6, A pair of rail assemblies 125 accommodates racking movement of the circuit breaker 120 between a withdrawn or extended position to a retracted or "engaged" position, wherein each of the circuit breaker load current carrying primary terminals 131 (FIG. 1) is engaged with a corresponding switchboard primary disconnect terminal 132 (FIG. 2). In the intermediate circuit breaker "test" position, each circuit breaker primary terminal 131 (FIG. 1) and corresponding primary disconnect terminal 132 (FIG. 2) are disengaged, while the circuit breaker secondary disconnect terminal members 129 (FIG. 1) remain engaged with corresponding switchboard secondary disconnect receptacles 139 (FIG. 2) to permit operational testing of the various accessory functions of in the circuit breaker 120. Intermediate the extended and test positions is the "disengaged" position wherein both the primary and secondary terminal pairs are disengaged. Racking movement between the test and engaged positions is effected by operation of a racking mechanism, generally indicated at 127 in FIG. 1.

During operation, a racking force is applied by racking mechanism 127 in a racking direction, generally indicated by arrow "R" in FIGS. 1 and 5, to circuit breaker 120 which causes the circuit breaker 120 to move in the first direction R to the test position, and/or the engaged position. Any lateral misalignment, between the circuit breaker secondary terminal members 129 and the rigidly mounted corresponding switchboard secondary terminal receptacles 139, is compensated by a lateral movement of the lateral adjustment portion 250 of the circuit breaker secondary terminal apparatus 128. For example, as the circuit breaker 120 is racked in to the test position, and/or the engaged position, lateral misalignment between the secondary terminal apparatus 128 and enclosure secondary disconnect apparatus 138 may result in an undesired interference between at least one circuit breaker secondary contact 129 and at least one rib 341 of secondary terminal apparatus 128. However, as the circuit breaker 120 continues to be racked in the racking direction R, a net lateral force is applied to the secondary terminal apparatus 128 through rib 341 of the rigidly mounted enclosure secondary disconnect apparatus 138. The racking force and net lateral force applied through rib 341 in turn causes circuit breaker secondary terminal assembly 128 to move along an axis in one of a first or a second lateral direction, generally indicated by double-headed arrow "M", at an angle to the racking direction R. In an embodiment, first and second guide members 271, 272 are arranged to define the first and second direction M. In another embodiment, resilient biasing members 283 provide a return force, along the axis of lateral movement of circuit breaker secondary terminal assembly 128.

As the racking force continues to be applied, circuit breaker secondary terminal assembly 128 continues to move in response to the racking force and the net lateral force applied through rib 341 until the undesired interference between the circuit breaker secondary terminal 129 and rib 341 of secondary terminal apparatus 128 is overcome. When the undesired interference is thus cleared due to the travel of circuit breaker secondary terminal assembly 128 along in one of a first or a second lateral direction, the corresponding secondary disconnect terminals 129, 139 in turn proceed to the desired proper engagement.

This specification, including the claims, abstract and drawings, is intended to cover any adaptations or variations of the specific embodiments illustrated and described herein. Accordingly, the names of elements, components or features, of the above-described system, methods, and apparatus are not intended to be limiting. It is contemplated that the above-described embodiments, whether adapted or varied or not, are applicable to future devices and apparatus. Moreover, the terminology used herein is intended to encompass all devices and apparatus that provide the same or equivalent functionality described herein.

Although effort was made to show all of the particular elements, components or features of each of the above-described specific embodiments in separate figures, this may not have been possible. In the event that one or more elements, components or features of one or more of the above-described specific embodiments are shown in some drawings and not in others, it is contemplated that each element, component or feature of one drawing may be combined with any or all of the other elements, components or features shown in any or all of the remainder of the drawings, as described herein, as claimed herein or in any other suitable fashion.

The words "including", "comprising", "having", and "with" as used herein are to be interpreted broadly and comprehensively and are not limited to any physical interconnection. Additionally, patentable scope is defined by the following claims, which are intended to encompass not only the specific embodiments described above, but also adaptations or variations thereof (i) that have structural elements that do not differ from the literal language of the claims, or (ii) that have equivalent structural elements with insubstantial differences from the literal language of the claims.

As used herein, an element or function recited in the singular and proceeded with the word "a" or "an" should he understood as not excluding plural said elements or functions, unless such exclusion is explicitly recited. Furthermore, references to "one embodiment" of the claimed invention should not be interpreted as excluding the existence of additional embodiments that also incorporate the recited features.

What is claimed is:

1. A secondary disconnect apparatus for a circuit breaker, for making an electrical connection with a mating enclosure secondary disconnect apparatus, the apparatus comprising:
    a first stop plate comprising a first stop plate surface;
    a second stop plate comprising a second stop plate surface;
    said first and second stop plates being configured to be coupled to the circuit breaker such that said first and second stop plate surfaces are spaced apart to define a first distance D1;
    a secondary terminal member, arranged and disposed to facilitate a slidable connection with the mating enclosure secondary disconnect assembly;
    a base portion configured to support said secondary terminal member;
    a lateral adjustment portion coupled to said base portion, comprising a first adjustment member surface and a second adjustment member surface, the adjustment member surfaces being spaced apart to define a second distance D2;
    a first guide member and a second guide member being in slidable communication with, and configured to guide a movement of said lateral adjustment portion along an axis in one of a first and a second direction;
    wherein said first adjustment member surface is configured to cooperate with said first stop plate surface to limit the travel of lateral adjustment portion in the first direction, and said second adjustment member surface is configured to cooperate with said second stop plate surface to limit the travel of lateral adjustment portion in the second direction;
    and wherein a total predetermined lateral distance of travel of lateral adjustment portion is based on at least the difference between first distance D1 and second distance D2.

2. The secondary disconnect apparatus of claim 1 further comprising a plurality of resilient members configured and disposed to provide a return force in a direction opposite the first direction of travel of lateral adjustment portion.

3. The secondary disconnect apparatus of claim 1 further comprising a plurality of resilient members configured and disposed to provide a return force in a direction opposite the second direction of travel of lateral adjustment portion.

4. The secondary disconnect apparatus of claim 1 wherein said first guide member and said second guide member are pins.

5. The secondary disconnect apparatus of claim 1 wherein said first distance D1 is greater than second distance D2.

6. The secondary disconnect apparatus of claim 1 further comprising an anchor member mechanically coupled with circuit breaker and configured to support said first and second stop plates.

7. The secondary disconnect apparatus of claim 1 wherein said lateral adjustment portion comprises a U-shaped cross section.

* * * * *

UNITED STATES PATENT AND TRADEMARK OFFICE
CERTIFICATE OF CORRECTION

PATENT NO. : 8,497,439 B2  
APPLICATION NO. : 13/044700  
DATED : July 30, 2013  
INVENTOR(S) : Pai et al.

Page 1 of 2

It is certified that error appears in the above-identified patent and that said Letters Patent is hereby corrected as shown below:

On the Title Page, item (56), under "OTHER PUBLICATIONS", in Column 2, Line 12,
delete "90b7e9f76628334985256f170049fae5" and
insert -- 90b7e9f76628334985256ff70049fae5 --, therefor.

In the Specification

In Column 1, Line 12, delete "the same," and insert -- the same. --, therefor.

In Column 1, Lines 35-36, delete "breaker such cases," and
insert -- breaker. In such cases, --, therefor.

In Column 2, Line 1, delete "the fill" and insert -- the full --, therefor.

In Column 2, Line 6, delete "apparatus operates" and
insert -- apparatus operate --, therefor.

In Column 2, Line 25, delete "slide of" and insert -- slide off --, therefor.

In Column 3, Line 38, delete "assembly;" and insert -- assembly; and --, therefor.

In Column 3, Line 41, delete "installed;" and insert -- installed. --, therefor.

In Column 3, Line 64, delete "sidewalk" and insert -- sidewalls --, therefor.

in Column 4, Line 55, delete "buy way" and insert -- by way --, therefor.

In Column 4, Line 65, delete "abuse" and insert -- a base --, therefor.

Signed and Sealed this
Twelfth Day of November, 2013

Teresa Stanek Rea
*Deputy Director of the United States Patent and Trademark Office*

CERTIFICATE OF CORRECTION (continued)
U.S. Pat. No. 8,497,439 B2

In Column 5, Line 24, delete "distance" and insert -- distance D1. --, therefor.

In Column 7, Line 40, delete "should he" and insert -- should be --, therefor.